United States Patent Office 3,642,755
Patented Feb. 15, 1972

3,642,755
CATALYST COMPOSITION
James A. Barter, Akron, Clifford O. Eddy, Independence, and Henry C. Stevens, Akron, Ohio, assignors to PPG Industries, Inc., Pittsburgh, Pa.
No Drawing. Filed Sept. 26, 1968, Ser. No. 762,996
Int. Cl. C08f 3/22
U.S. Cl. 260—92.1
9 Claims

ABSTRACT OF THE DISCLOSURE 3-methyl-3-tertiarybutylperoxy butyric acid, salts and esters thereof its preparation and use as a polymerization initiator for ethylenically unsaturated monomers is described.

BACKGROUND OF THE INVENTION

The use of peroxy compounds as a source of free radicals for the polymerization of ethylenically unsaturated monomers is known. The choice of a particular peroxy compound for a particular polymerization depends on such things as the compound's solubility in the polymerization medium, its half-life at the temperature of polymerization, and the properties of the polymer produced by its use. In the aqueous polymerization of ethylenically unsaturated compounds such as halogen-containing ethylenically unsaturated materials, e.g., vinylidene fluoride, the properties of the polymer produced are particularly sensitive to the initiator used.

Free-radical initiators such as the persulfates, ditertiarybutyl peroxide and disuccinic acid peroxide have been described as useful for the polymerization of vinylidene fluoride and like monomers; however, their utility as polymerization initiators for such materials has not been completely satisfactory. For example, the polymerization of vinylidene fluoride with a persulfate initiator, such as potassium or ammonium persulfate, yields polyvinylidene fluoride with relatively poor thermal stability. See, for example, U.S. Pat. 3,193,539 and U.S. Pat. 3,245,971. Ditertiarybutyl peroxide has also been found to be unacceptable as a polymerization initiator for vinylidene fluoride because of the production of polymer in the form of lumps rather than as fine particles. See, for example, U.S. Pat. 3,245,971. Similarly, the use of disuccinic acid peroxide as a polymerization initiator for vinylidene fluoride produces a product which has a molecular weight that is too high for use in such principal application areas as coatings and paints. There is, therefore, a continuing need for peroxy compounds suitable as initiators for fluoro-substituted olefins susceptible to free-radical polymerization, such as vinylidene fluoride, in an aqueous polymerization medium.

SUMMARY OF THE INVENTION

It has now been discovered that 3-methyl-3-tertiarybutylperoxy butyric acid, and its salts, are useful as polymerization initiators for ethylenically unsaturated compounds. It has further been discovered that they are especially useful for the polymerization of fluoro-substituted olefins, such as vinylidene fluoride, in an aqueous polymerization medium. It has also been found that this novel substituted butyric acid can be synthesized by the reaction of diacetone alcohol or mesityl oxide with tertiarybutyl hydroperoxide followed by a haloform reaction with the resulting 4-methyl-4-tertiarybutylperoxy pentanone-2 product.

DETAILED DESCRIPTION

The polymerization of ethylenically unsaturated halogen-containing compounds, and particularly fluorine-containing ethylenically unsaturated monomers, produce polymers which have been found useful in such areas as coatings and paints. For best results, the polymer should be white, of suitable molecular weight and particle size. For example, in the case of polyvinylidene fluoride. Gardner-Holdt viscosities will range from about 10 to about 200 seconds and the particle size will vary from about 0.1 to about 1.0 micron, preferably from about 0.4 to 0.6 micron. As discussed hereinabove, neither the inorganic peroxy compounds, such as the persulfates, or the organic peroxy compounds, such as ditertiarybutyl peroxide and disuccinic acid peroxide, have been found completely satisfactory as polymerization initiators for the aforementioned polymerizations.

It has now been discovered that 3-methyl-3-tertiarybutylperoxy butyric acid and its salts are especially useful as polymerization initiators for ethylenically unsaturated halogen-containing compounds, particularly for the polymerization of fluorine-containing ethylenically unsaturated compounds such as vinylidene fluoride; and, that their use produces a polymer of suitable molecular weight, color and particle size. Moreover, it has been found that these initiators are relatively unaffected by redox agents such as iron, as is the case with disuccinic acid peroxide. See, for example, U.S. Pats. 2,750,350 and 3,245,971. Since the aforementioned substituted butyric acid and its salts are a source of free radicals, they are also useful as polymerization initiators for ethylenically unsaturated compounds susceptible to free-radical polymerization. Hereinafter, for the sake of brevity, reference to the above-recited butyric acid is intended to include the salts thereof.

It is surprising to find that 3-methyl-3-tertiarybutylperoxy butyric acid is a source of free radicals because it has been observed that 2-tertiarybutylperoxy-2-methyl propionic acid undergoes ionic decomposition instead of forming free radicals. See the Journal of the American Chemical Society, 89:9, pp. 2230–31, (Apr. 26, 1967).

The amount of 3-methyl-3-tertiarybutylperoxy butyric acid used in conducting the polymerization of the herein described ethylenically unsaturated compounds is that amount required to initiate polymerization, i.e., an initiating amount. Typically, between about 0.02 and about 1.0 weight percent of 3-methyl-3-tertiarybutylperoxy butyric acid, based on the weight of ethylenically unsaturated compound charged to the reaction vessel, is employed. However, greater or lesser amounts can be used if such is required by the particular polymerization conditions desired.

Polymerization temperatures will vary greatly and usually depend on the polymerization rate desired. Typically, polymerization temperatures will range between about 50° C. and about 130° C. and usually will range between about 80° C. and about 110° C. Temperatures below 50° C. can be employed; however, at such temperatures, the polymerization rate is slow. Similarly, at temperatures above 130° C., the polymerization rate is very rapid and requires special efforts to remove the heat dissipated by the polymerization reaction. Thus, although temperatures above 130° C. can be employed, such temperatures are usually avoided in order to eliminate the additional problems created by the substantial amount of heat liberated. Polymerization pressures will vary greatly also and depend, in part, on the compound polymerized and the type of polymerization, e.g., solution, bulk, or emulsion. Thus, polymerization pressures can be at atmospheric, autogenous or superatmospheric pressures.

Vinylidene fluoride polymerization pressures are usually superatmospheric, e.g., at least about 200 pounds per square inch gauge. At pressures below 200 p.s.i.g., polymerization rates are slow. There is no critical upper limit to the polymerization pressure. For example, pressures as high as 20,000 pounds per square inch gauge and more can be employed, if desired. Typically, the upper pressure limit is determined by the design limits of the equipment used for the polymerization. Therefore, polymerization pressures will range typically from about 200 p.s.i.g. to 3,000 p.s.i.g., and usually will range from about 300 p.s.i.g. to 1,200 p.s.i.g.

Aqueous polymerization media are conveniently used with 3-methyl-3-tertiarybutylperoxy butyric acid for the reason that the acid is sufficiently water-soluble. In suspension-type polymerizations, where it is usually desired that the initiator be soluble in the monomer polymerized, the free acid form is conveniently used. In emulsion-type polymerizations, where it is usually desired that the initiator be soluble in the aqueous polymerization media, either the free acid form or a water-soluble salt of the acid can be used. The water used as the polymerization medium is preferably deoxygenated and deionized. The amount of water used can vary over a relatively wide range. Typically, the weight ratio of water to polymerizable compound ranges from about 2:1 to about 40:1 and usually ranges from about 3:1 to about 20:1.

When it is desired to obtain a polymer as a dispersion or latex which can be coagulated to form an easily handled, free-flowing powder, a surfactant is used. The concentration of the surfactant is not critical and depends on the type of polymerization conducted, i.e., emulsion, suspension, or solution precipitation. Typically, the surfactant or dispersant is used in minor amounts that range from about 0.05 to about 5 weight percent based on the polymerization medium, e.g., water. Usually from about 0.1 to about 2 weight percent surfactant is used. It is preferred that the surfactant be inert to the growing polymer chain.

A particularly suitable class of surfactants for use with halogen-containing unsaturated compounds are the highly fluorinated or highly fluorochlorinated group of surfactants having from 6 to about 20 carbon atoms and preferably from about 7 to about 15 carbon atoms. Examples of such surfactants are the perfluorocarboxylic acids or their water soluble salts, such as hydroperfluoroheptanoic acid, perfluorooctanoic acid, perfluorononanoic acid or perfluorodecanoic acid and the alkali metal or ammonium salts thereof. Other types of surfactants include: "chlorendic acid," a hexachloroendomethylene tetrahydrophthalic acid, and tetrachlorophthalic acid. In the polymerization of fluorine-containing monomers, it is desirable to use a small amount of an ammonium salt of a fluoroacid even when other surfactants are used. Surfactants of the aforementioned type are well known in the art and have been adequately described therein. See, for example, U.S. Pats. 3,193,539 and 3,245,971, and British Pat. 861,951.

In carrying out the polymerizations described herein, any charging sequence to the polymerization reactor can be used. A convenient sequence especially in connection with gaseous monomers, comprises charging water to the reactor together with the surfactant and initiator. Thereafter, the air space in the reactor is evacuated or swept out with an inert gas, monomer charged to the reactor under pressure, and the reactor heated to polymerization temperature. Polymerizations can be carried out either as a batch operation or as a continuous operation. In the latter, the reactor is connected to a source of monomer under pressure such that fresh monomer charge enters the reactor as conversion to polymer occurs. Typically, for a continuous run, sufficient water, initiator and surfactant for the entire polymerization run, is charged to the reactor at the start of the run; however, one or more of these materials can be charged continuously or semi-continuously to the reactor as the run proceeds.

During polymerization, the reactor contents are preferably well agitated such as by an internal agitator or by shaking or rocking the reactor. Such agitation enhances the entrainment of the monomer in the polymerization medium.

Following the polymerization run, the pressure on the reactor is released and an aqueous suspension of polymer withdrawn. The polymer is recovered by centrifugation or by flocculating the polymer and recovering it by conventional techniques such as by filtration. The filtrate obtained after removal of the polymer from its aqueous suspension can be recirculated to the reactor for continued use. The polymer is then dried, ground and fluid energy milled to produce a free-flowing powder. In the case of polyvinylidene fluoride, drying is conveniently conducted at less than about 100° C. in a vacuum oven.

As recited above, 9-methyl-3-tertiarybutylperoxy butyric acid provides free radicals when undergoing decomposition. It, therefore, will initiate the polymerization of ethylenically unsaturated compounds susceptible to free-radical polymerization. The conditions of polymerization will, of course, vary with the particular compound polymerized. Compounds particularly susceptible to polymerization by 3-methyl-3-tertiarybutylperoxy butyric acid are the halogen-containing ethylenically unsaturated compounds of from 2 to 10 carbon atoms. Especially susceptible are the fluorine and chlorine-containing ethylenically unsaturated compounds of from 2 to 4 carbon atoms.

The following compounds and classes of compounds are merely illustrative of compounds polymerizable with the initiator of the present invention: monoolefins such as ethylene, propylene, butylene and styrene; diolefins such as butadiene and methylbutadiene; acrylic derivatives such as acrylic acid, methacrylic acid, acrylamide, acrylonitrile, methacrylonitrile, and $C_1$-$C_4$ alkyl esters of acrylic acid and methacrylic acid; vinyl esters such as vinyl acetate, vinyl propionate, vinyl phosphonic acid and the esters thereof; halogen-containing vinyl compounds such as vinyl chloride, vinyl fluoride, chlorotrifluoroethylene, tetrafluoroethylene, 1,1 - difluoro - 2,2 - dichloroethylene, perfluoropropylene, 3,3,3-trifluoropropylene, 3,3,3 - trichloropropylene, and 2 - chloropropylene; vinylidene compounds such as vinylidene chloride, vinylidene fluoride, vinylidene cyanide; vinyl ketones, esters of unsaturated mono-, di-, and polycarboxylic acids; N-vinyl compounds; acrolein, halogenated derivatives of butene, isobutene, butadiene, isoprene and styrene, e.g., 3,4-dichloroperfluorobutene-1, 4,4,4-trichlorobutene-1, 1,1-dichlorobutene-1, 2-trichloromethylpropene, chloroprene, and 2-trichloromethylbutadiene-1,3.

Copolymers prepared by polymerizing a mixture of two or more of the ethylenically unsaturated compounds susceptible of free-radical polymerization mentioned above can also be prepared with the aforementioned initiator.

The utility to which polymers prepared by the polymerization of monomeric compounds with 3-methyl-3-tertiarybutylperoxy butyric acid can be put depends on the particular polymer and is well known in the poymer art. Polyvinylidene fluoride, for example, can be used for wire and cable insulation, electronic/electrical components, irradiated shrinkable tubing, chemical process equipment components, aerospace components in contact with storable propellants, and as a long-life, durable finish for exterior siding.

In conducting the polymerizations described hereinabove, either 3-methyl-3-tertiarybutylperoxy butyric acid or carboxylate derivatives thereof can be employed. Thus, for example, any organic ester or inorganic salt that provides an initiating amount of free radicals in either the monomer or the polymerization medium can be used. Typically, the free acid, or alkali and alkaline earth metal salts thereof are used. Preferably, the highly water-soluble alkali metal salts of the acid are used. The aforementioned initiators can be depicted by the general formula:

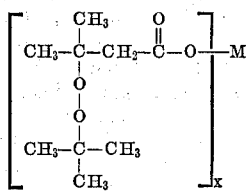

wherein M is selected from the group consisting of hydrogen, alkali metals, alkaline earth metals, and organic radicals such as $C_1$–$C_4$ alkyls, and $x$ is a cardinal number, i.e., 1 or 2, corresponding to the normal valence of the member of the group selected. The terms alkali metals and alkaline earth metals are intended to mean and include those metals of Groups I-A and II respectively of the Periodic Chart of the Elements (Handbook of Chemistry and Physics, Chemical Rubber Publishing Co., Cleveland, Ohio, 34th edition, pp. 342–43), e.g., sodium, potassium, lithium, rubidium, cesium, calcium, barium, strontium and magnesium.

Preparation of 3-methyl-3-tertiarybutylperoxy butyric acid

The base catalyzed Michael addition of an alkyl hydroperoxide to an olefinically unsaturated compound containing a meta-directing group to form esterified carboxyl-substituted hydrocarbon peroxides was first mentioned in U.S. Pat. 2,508,256. However, more recent experimental evidence has found that with the exception of methyl acrylate and acrylonitrile, the aforementioned addition reaction yields the corresponding epoxy ketone. See, U.S. Pat. 3,062,841 and the Journal of the American Chemical Society, vol. 80, pp. 5845–48 (1958).

It has now been found that 4-methyl-4-tertiarybutylperoxy pentanone-2 can be obtained by the addition of tertiarybutyl hydroperoxide to diacetone alcohol or mesityl oxide under acidic conditions. It has further been found that a salt of 3-methyl-3-tertiarybutylperoxy butyric acid can be obtained by conducting a haloform reaction with the aforementioned substituted pentanone.

Diacetone alcohol is commercially available and can be prepared from acetone by base catalyzed condensation thereof. Tertiarybutyl hydroperoxide is also commercially available. The addition of tertiarybutyl hydroperoxide to diacetone alcohol or mesityl oxide is a stoichiometric reaction in that one mole of the addition product requires one mole of each of the reactants. However, the mole ratio of the reactants to one another is not critical. Typically, an excess of diacetone alcohol or mesityl oxide is used since they are less expensive than the tertiary butyl hydroperoxide.

The addition of tertiarybutyl hydroperoxide to diacetone alcohol or mesityl oxide is conducted in the presence of an acid that is a good hydrogen ion source. Typically, the mole ratio of diacetone alcohol or mesityl oxide to the acid is 1:0.25 to 1:2.0, usually about 1:0.75. The concentration of the acid is not critical; however, the more concentrated the acid, the smaller the quantity of acid required. Although any source of hydrogen ion can be employed, it is convenient to utilize strong acids, such as sulfuric acid, hydrochloric acid, methanesulfonic acid, or toluenesulfonic acid. Preferably, a strong mineral acid is used.

The temperature and pressure at which tertiarybutyl hydroperoxide adds to diacetone alcohol or mesityl oxide are not critical. Since the addition reaction is exothermic, it is convenient to conduct the addition at about room temperature, e.g., 25° C., or below in order to allow removal of the heat of reaction. Typically, a temperature of from 25° C. to 30° C. is used. If the heat of addition is not removed, or if temperatures above 30° C. are used, the addition reaction occurs rapidly, is very exothermic and requires cooling. Atmospheric pressures are conveniently employed for the addition reaction; however, subatmospheric or superatmospheric pressures could be employed if desired.

In conducting the aforementioned addition reaction, it is convenient to add the tertiarybutyl hydroperoxide dropwise to a mixture of the diacetone alcohol or mesityl oxide and acid with constant stirring; however, any sequence of addition can be employed. The mixture of alcohol or oxide and acid can be prepared conveniently by adding the acid to the alcohol or oxide at a temperature of about 5° C.

The pentanone product resulting from the addition reaction, i.e., 4-methyl-4-tertiarybutylperoxy pentanone-2, is separated from the reaction mixture as the organic layer of the two-phase mixture. Purification is achieved by distillation at reduced pressures. The aforesaid pentanone product has a boiling point of about 53° C. at 3.5 millimeters of mercury and a refractive index ($n_D^{20}$) of 1.4196. Infrared analysis of 4-methyl-4-tertiarybutylperoxy pentanone-2 shows: no —OH absorption, carbonyl absorption at 1700 cm.$^{-1}$, C—H stretching absorptions at 2974 and 2940 cm.$^{-1}$, tertiaryalkyl absorptions at 1358 cm.$^{-1}$, a band at 1190 cm.$^{-1}$, and a peroxide absorption at 865 cm.$^{-1}$. The identification was further verified by nuclear magnetic resonance analysis.

The preparation of 4-methyl-4-tertiarybutylperoxy pentanone-2 can be depicted (with diacetone alcohol) as follows:

(Eq. 1)

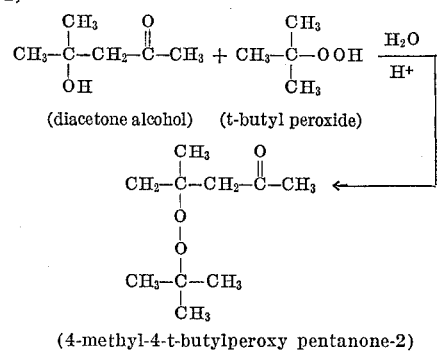

(4-methyl-4-t-butylperoxy pentanone-2)

A haloform reaction, preferably a bromoform reaction, is then conducted with 4-methyl-4-tertiarybutylperoxy pentanone-2 to give the corresponding salt of 3-methyl-3-tertiarybutylperoxy butyric acid. Recovery and washing of the salt with any suitable acid yields the aforementioned free acid. Typically, bromoform reactions are conducted below room temperature because of the instability of hypobromite at moderate or high temperatures.

In conducting the haloform reaction, it is convenient to add the halogen to an aqueous solution of base followed by the slow addition of 4-methyl-4-tertiarybutylperoxy pentanone-2. The salt of 3-methyl-3-tertiarybutylperoxy butyric acid corresponding to the metal of the base employed in the haloform reaction is formed and the free acid recovered from the reaction mixture by standard techniques, e.g., separation, neutralization, solvent extraction, and recovery of the desired product from the solvent.

The haloform reaction—so named because its use produces haloforms, e.g., chloroform, bromoform and iodoform—relates, in part, to the reaction of compounds containing a $CH_3CO$— group linked to a hydrogen or to another carbon atom with halogen in an aqueous basic solution. Typically, the halogen is dissolved in an aqueous alkaline reagent (usually sodium hydroxide or sodium carbonate) to form the corresponding metal hypohalite, e.g., sodium hypohalite, calcium hypohalite. The reaction is said to occur in two phases and can be illustrated by the following balanced equations:

(Eq. 2)  $RCOCH_3 + 3MOX \rightarrow RCOCX_3 + 3MOH$ (Eq. 3)  $RCOCX_3 + MOH \rightarrow RCOOM + CHX_3$ The methyl group is fully substituted by halogen to give an intermediate trihaloketone (Eq. 2); the trihaloketone breaks down in the presence of the alkaline agent to produce the haloform and the metal salt of a monocarboxylic acid (Eq. 3). For a more detailed explanation of the haloform reaction, see the McGraw-Hill Encyclopedia of Science and Technology, vol. 6, pp. 323–24, McGraw-Hill Book Co., Inc., New York, (1960). The aforementioned reference is incorporated herein by reference in toto.

With regard to the haloform reaction with 4-methyl-4-tertiarybutylperoxy pentanone-2, the methyl group adjacent to the carbonyl grouping is oxidized to give a carboxyl group. This haloform reaction can be depicted (with sodium hypobromite) in accordance with Equations 2 and 3 as follows:

(Eq. 4)

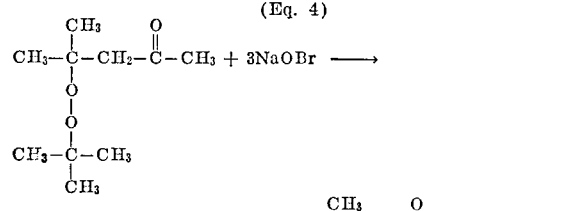

(Eq. 5)

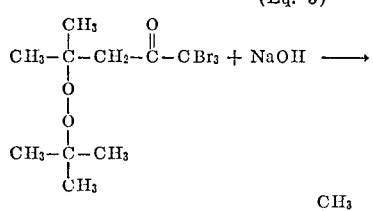

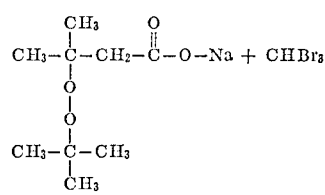

(sodium salt of 3-methyl-3-t-butylperoxy butyric acid)

Although the synthesis of 3-methyl-3-tertiarybutylperoxy butyric acid has been described with particularity, it is not intended to limit the invention thereby.

As detailed above, haloform reactions are used as standard organic techniques, Advanced Organic Chemistry, by Fieser and Fieser, pp. 345–47, Reinhold Publishing Corporation, New York, (1962). It employs a dilute aqueous solution of an alkaline reagent, typically an alkali metal hydroxide or carbonate, and halogen, e.g., chlorine, iodine or bromine. The standard recipe for conducting haloform reactions comprises 3 moles of halogen, 8.25 moles of base, e.g., sodium hydroxide, and one mole of the compound containing the $CH_3CO-$ group Organic Syntheses, Collective volume I, p. 526, John Wiley and Sons, Inc., New York, (1961). Both of the preceding references are incorporated here by reference in toto.

The present invention is more particularly described in the following examples which are intended as illustrative only since numerous modifications and variations therein will be apparent to those skilled in the art.

EXAMPLE I

Preparation of 3-methyl-3-tertiarybutylperoxy butyric acid

Diacetone alcohol (1.0 mole) was charged to a three-necked, round-bottomed flask equipped with a stirrer, thermometer and addition funnel. The flask was cooled to about 5° C. and fifty percent (50%) sulfuric acid (0.75 mole) was added dropwise to the diacetone alcohol with cooling. At the end of the addition of sulfuric acid, the flask was warmed to room temperature (about 23° C.) and tertiarybutyl hydroperoxide (1.0 mole) was added dropwise to the flask at a rate sufficient to maintain the temperature of the flask between 25° C. and 30° C. The reaction mixture was stirred for four hours at between 25° C. to 30° C. The organic layer formed was separated from the acidic aqueous layer by separatory funnel and washed with water until neutral. The organic layer was then dried over anhydrous sodium sulfate, and distilled under a reduced pressure of 3.5 mm. of mercury through a Vigreaux column and 4-methyl-4-tertiarybutylperoxy pentanone-2 was recovered at about 53° C. Identification of the aforementioned pentanone was based on infrared and nuclear magnetic resonance analyses.

A round-bottomed flask cooled with an ice bath and equipped with thermometer, stirrer and addition funnel was charged with 920 milliliters of water and 2.65 moles of sodium hydroxide. The resulting sodium hydroxide solution was cooled to less than 5° C. and bromine (0.96 mole) was added dropwise to the sodium hydroxide solution at a rate which did not allow the solution to exceed 10° C. Thereafter, the reaction mixture was allowed to warm to room temperature and stirred for about 16 hours at room temperature (about 23° C.). The heavy layer in the flask was seperated from the aqueous layer by a separatory funnel. The aqueous phase was acidified with 50 percent sulfuric acid and washed with several portions of ether. The combined washings of ether were dried overnight with anhydrous sodium sulfate and the ether removed by means of a rotary film evaporator. The yield of undistilled 3-methyl-3-tertiarybutylperoxy butyric acid was about 70 percent based on the 4-methyl-4-tertiarybutylperoxy pentanone-2, Vacuum distillation of the crude 3-methyl-3-tertiarybutylperoxy butyric acid thus prepared resulted in the recovery of product at about 77° C. and at 0.10 millimeter of mercury. The refractive index ($n_D^{20}$) of this distilled product was 1.4351. Infrared analysis of the product showed: carboxyl absorption at 2610, 2700 and 1725 cm.$^{-1}$, peroxide absorption at 882 and 1200 cm.$^{-1}$. Equivalent weight by sodium hydroxide titration was 202 compared to a theoretical value of 190. Comparison of the aforementioned infrared data with published infrared data for 2-methyl-2-t-butylperoxy propionic acid plus formation of the compound from the well-identified ketone via the haloform reaction confirmed the identification.

EXAMPLE II

The procedure of Example I was repeated using mesityl oxide instead of diacetone alcohol, and 3-methyl-3-tertiarybutylperoxy butyric acid was recovered in essentially the same yields.

EXAMPLE III

A suitable autoclave was charged with 6.13 liters of water, 4.0 grams of 3-methyl-3-tertiarybutylperoxy butyric acid, and 4.0 grams of ammonium perfluorooctanoate. The autoclave was closed and agitation of the contents begun. The autoclave was then purged three times with nitrogen. After the nitrogen purge, the pressure was released and the autoclave heated to 100° C. Vinylidene fluoride monomer was then introduced into the autoclave until a pressure of 1,000 p.s.i.g. was reached. When enough monomer was consumed so that the pressure in the autoclave was reduced to 900 p.s.i.g., additional vinylidene fluoride monomer was introduced into the autoclave until the pressure again reached 1,000 p.s.i.g. This procedure was repeated until the polymerization was terminated at the end of 4.9 hours by turning off the heat and agitation. After the contents of the autoclave had cooled and the pressure released, the contents of the autoclave were removed through a bottom port of the autoclave. The product so removed was passed through a 100 mesh Monel screen to separate dispersed from non-dispersed product. The dispersed product (latex) was coagulated, filtered, washed on the filter with distilled water, and then with methanol and then dried in a vacuum oven at about 80° C. The dried product (475 grams) was micropulverized and then micronized at a feed pressure of 90 p.s.i. and a back pressure of 40 p.s.i.

The polyvinylidene fluoride product thus produced had an acceptable Gardner-Holdt viscosity and an average particle diameter of about 0.28 micron. Paint panels prepared with this product were evaluated for such properties as: cross hatch adhesion, pencil hardness, OT bend, 30# impact, resistance to hot water, gloss, general appearance and brightness; and, the panels were found to be acceptable.

EXAMPLE IV

The procedure of Example III was repeated except that 6.0 grams of 3-methyl-3-tertiarybutylperoxy butyric acid were used. Polyvinylidene fluoride and paints prepared therefrom similar to that of Example III were obtained.

EXAMPLE V

The procedure of Example III is repeated except that ethylene is used in place of vinylidene fluoride. A fine suspension of polyethylene in water is produced.

EXAMPLE VI

Styrene (100 grams), water (180 grams), 3-methyl-3-tertiarybutylperoxy butyric acid (1 gram), and sodium lauryl sulfate (10 grams) are charged to a crown capped bottle. The bottle is tumbled in a heated bath at 100° C. until an emulsion of polystyrene is obtained.

EXAMPLE VII

Vinyl chloride (100 grams), water (150 grams), sodium lauryl sulfate (5 grams), and 3-methyl-3-tertiarybutylperoxy butyric acid (1 gram) are heated to 100° C. in a stirred autoclave for six hours. An emulsion of polyvinyl chloride is obtained.

EXAMPLE VIII

The procedure of Example VII is employed except that methyl methacrylate is substituted for vinyl chloride. An emulsion of polymethyl methacrylate is obtained.

While there are above described a number of specific embodiments of the present invention, it is obviously possible to produce other embodiments and various equivalent modifications thereof without departing from the spirit of the invention.

Having set forth the general nature and specific embodiments of the present invention, the scope thereof is now particularly pointed out in the appended claims.

We claim:

1. In a process for polymerizing ethylenically unsaturated compounds, the improvement which comprises conducting the polymerization in the presence of an initiating amount of an initiator selected from the group consisting of 3 - methyl - 3 - tertiarybutylperoxy butyric acid, alkali and alkaline earth metal salts thereof, and $C_1$-$C_4$ alkyl esters thereof.

2. A process according to claim 1 wherein the ethylenically unsaturated compound is a halogen-containing ethylenically unsaturated compound.

3. A process according to claim 2 wherein the halogen is selected from the group consisting of chlorine, fluorine and mixtures thereof.

4. A process according to claim 3 wherein from about 0.02 to about 1.0 weight percent initiator, based on the halogen-containing ethylenically unsaturated compound, is used.

5. A process according to claim 1 wherein from about 0.02 to about 1.0 weight percent initiator, based on the ethylenically unsaturated compound, is used.

6. In a process for the polymerization of fluorine-containing ethylenically unsaturated compounds in an aqueous medium, the improvement which comprises polymerizing said compounds in the presence of an initiating amount of an initiator selected from the group consisting of 3-methyl-3-tertiarybutylperoxy butyric acid, alkali and alkaline earth metal salts thereof, and $C_1$-$C_4$ alkyl esters thereof.

7. A process according to claim 6 wherein the ethylenically unsaturated compound is vinylidene fluoride.

8. A process according to claim 6 wherein the polymerization is conducted at temperatures within the range of between about 50° C. and about 130° C.

9. In a process for polymerizing vinylidene fluoride in an aqueous medium with a peroxide initiator, the improvement which comprises using as the initiator from 0.02 to about 1.0 weight percent of a compound depicted by the general formula:

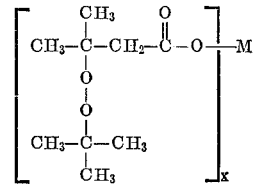

wherein M is selected from the group consisting of hydrogen, alkaline earth metals and alkali metals, and $x$ is a cardinal number corresponding to the normal valence of the member of the group selected.

References Cited

UNITED STATES PATENTS

| | | | |
|---|---|---|---|
| 3,193,539 | 7/1965 | Hauptschein | 260—92.1 |
| 3,245,971 | 4/1966 | Iserson | 260—92.1 |

OTHER REFERENCES

Mageli et al., Industrial and Engineering Chemistry, vol. 58, No. 3 (March 1966), pp. 25-31.

HARRY WONG, Jr., Primary Examiner

U.S. Cl. X.R.

260—29.6, 63, 67, 78.4, 80, 80.3, 82.1, 85.5, 85.7, 86.1, 87.5, 87.7, 88.1, 88.2, 88.7, 89.1, 89.5, 89.7, 91.7, 92.8, 93.5, 93.7, 94.2, 94.8, 94.9, 478, 526R, 593